(12) United States Patent
Haastrup et al.

(10) Patent No.: US 10,694,283 B2
(45) Date of Patent: Jun. 23, 2020

(54) SUSPENDED SPEAKER HOUSING IN A TELECONFERENCE SYSTEM

(71) Applicant: Logitech Europe S.A., Lausanne (CH)

(72) Inventors: Kenneth Norman Haastrup, Fremont, CA (US); Howard Takeo Miyamura, Newark, CA (US); Beau Calvin Chimene, Austin, TX (US); Alexander Vitalyevich Korolenko, Palo Alto, CA (US); Bill Cheng, Fremont, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/987,842

(22) Filed: May 23, 2018

(65) Prior Publication Data

US 2019/0364357 A1 Nov. 28, 2019

(51) Int. Cl.
*H04R 1/28* (2006.01)
*H04M 1/19* (2006.01)
*H04M 1/62* (2006.01)
*H04R 1/02* (2006.01)

(52) U.S. Cl.
CPC ............. *H04R 1/288* (2013.01); *H04M 1/19* (2013.01); *H04M 1/62* (2013.01); *H04R 1/025* (2013.01)

(58) Field of Classification Search
CPC ......... H04R 1/288; H04R 1/025; H04M 1/19; H04M 1/62
See application file for complete search history.

(56) References Cited

U.S. PATENT DOCUMENTS

| | | | | |
|---|---|---|---|---|
| 4,550,429 A | * | 10/1985 | Burbank | H04R 1/025 379/420.02 |
| 8,116,500 B2 | * | 2/2012 | Oxford | H04R 1/406 379/388.01 |
| 2005/0058300 A1 | * | 3/2005 | Suzuki | H04R 1/406 381/92 |
| 2009/0071322 A1 | * | 3/2009 | Oxford | F41H 3/00 89/36.02 |

* cited by examiner

*Primary Examiner* — Tuan D Nguyen
(74) *Attorney, Agent, or Firm* — Kilpatrick Townsend & Stockton LLP

(57) ABSTRACT

Aspects of the invention can include a teleconferencing system having a system housing, a speaker enclosure configured within the system housing, a speaker mounted to the speaker enclosure, and one or more damping cushions coupling the speaker enclosure to the system housing. The one or more damping cushions can suspend the speaker enclosure within the system housing such that the speaker enclosure is separated and mechanically isolated from the system housing by at least a minimum distance (e.g., 2 mm). In some cases, the one or more damping cushions provide the only structural coupling between the speaker enclosure and the system housing. The one or more damping cushions can be configured to dampen mechanical energy generated by the speaker thereby preventing at least a portion of the mechanical energy form coupling to the system housing via the one or more damping cushions.

20 Claims, 10 Drawing Sheets

SUSPENDED SPEAKER HOUSING IN A TELECONFERENCE SYSTEM

BACKGROUND

Teleconference systems (e.g., conference phones) often include a particular type of phone that is well-suited for use in telephone conference calls with multiple people calling from multiple different geographic locations. A typical teleconference device may be similar to a conventional mobile phone in that it may include a keypad to dial phone numbers and, in some cases, a display to render data relevant to the call including the phone number, participant names, a local time, the length of the call, and the like, but typically does not include a handset. Rather, teleconference devices often include a loudspeaker to allow all participants to hear the conversation and a microphone to enable hands-free use.

Teleconference systems have improved as new generations are introduced into the market. For instance, high fidelity speakers and microphones can be found on contemporary devices. Some modern displays offer richer content, improved resolution, sleeker user interfaces, and greater functionality. In many modern teleconference systems, video conferencing may be integrated with the audio for a more engaging communication experience.

Despite the many improvements in teleconference systems, many teleconference systems still incorporate suboptimal design choices and performance tradeoffs to accommodate certain performance specifications that continue to plague even the more contemporary high end systems. Thus, continued innovation is needed to address the inherent design flaws that necessitate these performance tradeoffs to make for better quality, more robust, and higher fidelity teleconference systems.

BRIEF SUMMARY

In some embodiments, a teleconferencing system may include a system housing, a speaker enclosure configured within the system housing, a speaker mounted to the speaker enclosure, and one or more damping cushions coupling the speaker enclosure to the system housing, where the one or more damping cushions suspend the speaker enclosure within the system housing such that the speaker enclosure is isolated and separated from the system housing by at least a minimum distance (e.g., 2 mm or more). In some cases, the one or more damping cushions may provide the only structural coupling between the speaker enclosure and the system housing. The one or more damping cushions can be configured to dampen mechanical energy generated by the speaker thereby preventing at least a portion of the mechanical energy from coupling to the system housing via the one or more damping cushions. Each of the one or more damping cushions may be formed of a non-rigid and pliable compound. Any suitable shape may be used, including (at last partially) bulb-shaped implementations. In some cases, the one or more damping cushions may be configured to dampen the mechanical energy generated by the speaker and coupled to the system housing in three dimensions (e.g., damping along the same axis in which the damping cushion is mounted, as well as damping mechanical energy in axes orthogonal to the mounting axis. In some cases, the one or more damping cushions can be configured to support and suspend the speaker housing within the system housing along three dimensions.

The teleconferencing system may further include one or more microphones disposed in the system, where the one or more damping cushions can be further configured to reduce an amount of mechanical energy generated by the speaker and coupled to the microphone via the one or more damping cushions. The one or more damping cushions may dampen audio spectrum mechanical energy generated by the speaker and mechanically coupled to the system housing by at least 6 dB. In some cases, the audio spectrum may be a voice spectrum of 300 Hz-3000 Hz, although some may define other ranges as the voice spectrum (e.g., 100 Hz-3000 Hz, 100 Hz-1000 Hz, etc.). In some embodiments, the one or more damping cushions may have a non-linear force response profile such that they increase a compression resistance at an increasing rate as an increased compression is applied. Other non-linear force response profiles are possible.

In some embodiments, a teleconferencing system may include a system housing, a speaker enclosure configured within the system housing, a speaker mounted to the speaker enclosure, and one or more damping cushions coupling the speaker enclosure to the system housing, where the one or more damping cushions suspend the speaker enclosure within the system housing such that the speaker enclosure is isolated and separated from the system housing (e.g., by a uniform or non-uniform distance such as 2 mm, 5 mm, or other suitable distance), and where the one or more damping cushions provide the only structural coupling between the speaker enclosure and the system housing. In certain embodiments, the one or more damping cushions can have a non-linear force response profile causing the one or more damping cushions to increase in compression resistance at an increasing rate as an increased compression is applied.

In some implementations, the damping cushions may be bulb-shaped, bellows-shaped, or other suitable shape that can provide a similar force profile as described herein. The one or more damping cushions may be formed of a non-rigid and pliable compound, such as rubber, polyurethane, elastomer (e.g., thermoplastic elastomer), or other type with similar properties. In some cases, the one or more damping cushions can be configured to dampen the mechanical energy generated by the speaker and coupled to the system housing in three dimensions. Some embodiments may include a microphone disposed in the system housing, where the one or more damping cushions are further configured to reduce an amount of mechanical energy generated by the speaker and coupled to the microphone via the one or more damping cushions. In some cases, the one or more damping cushions dampen audio spectrum (e.g., 300 Hz-3000 Hz, or a subset thereof) mechanical energy generated by the speaker and mechanically coupled to the system housing by at least 6 dB.

In further embodiments, a teleconferencing system may include a system housing, a speaker enclosure configured within the system housing, a speaker mounted to the speaker enclosure, a microphone coupled to the system housing, and one or more damping cushions coupling the speaker enclosure to the system housing, where the one or more damping cushions can suspend the speaker enclosure within the system housing such that the speaker enclosure is isolated and separated from the system housing by at least a minimum distance, where the one or more damping cushions may provide the only structural coupling between the speaker enclosure and the system housing. In some cases, the one or more damping cushions dampen vibrational energy generated by the speaker and mechanically coupled to the at least one microphone via the one or more damping cushions (e.g., by 6 dB or more for certain frequencies). In some cases, the one or more damping cushions dampen vibrational energy generated by the speaker thereby preventing at least a portion of the mechanical energy form coupling to the at least one microphone via the one or more damping cushions (e.g., by 6 dB or more for certain frequencies, as further described below). Each of the one or more damping cushions may be mounted in a particular axis, and where each of the one or more damping cushions provides dampening of the vibrational energy vibrating along both the mounted axis and at least one axis orthogonal to the mounted axis (in some cases in 3 axes).

BRIEF DESCRIPTION OF THE DRAWINGS

The detailed description is set forth with reference to the accompanying figures.

DETAILED DESCRIPTION

Embodiments of this invention are generally directed to communication devices. More specifically, some embodiments relate to a teleconference system using an integrated and isolated speaker system for improved audio performance.

In the following description, for the purpose of explanation, numerous examples and details are set forth in order to provide an understanding of embodiments of the present invention. It will be evident, however, to one skilled in the art that certain embodiments can be practiced without some of these details, or with modifications or equivalents thereof.

Figure 1:
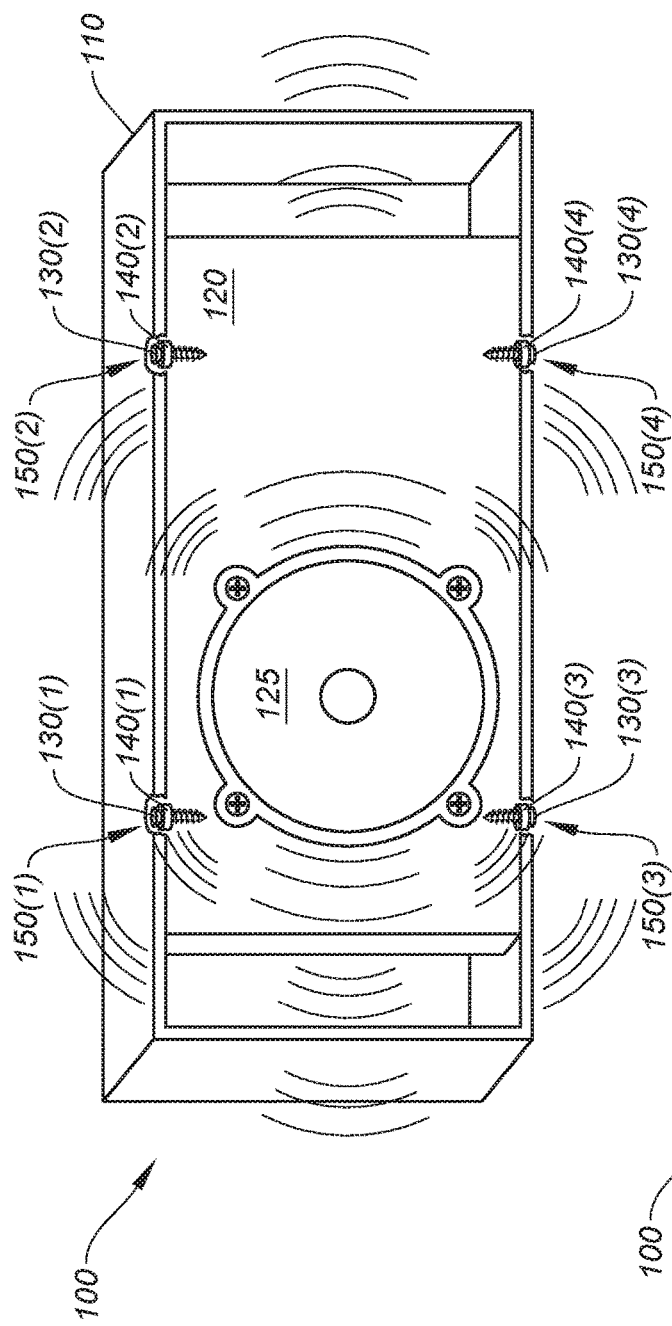
FIG. 1 shows a typical teleconference system.
Figure 2:
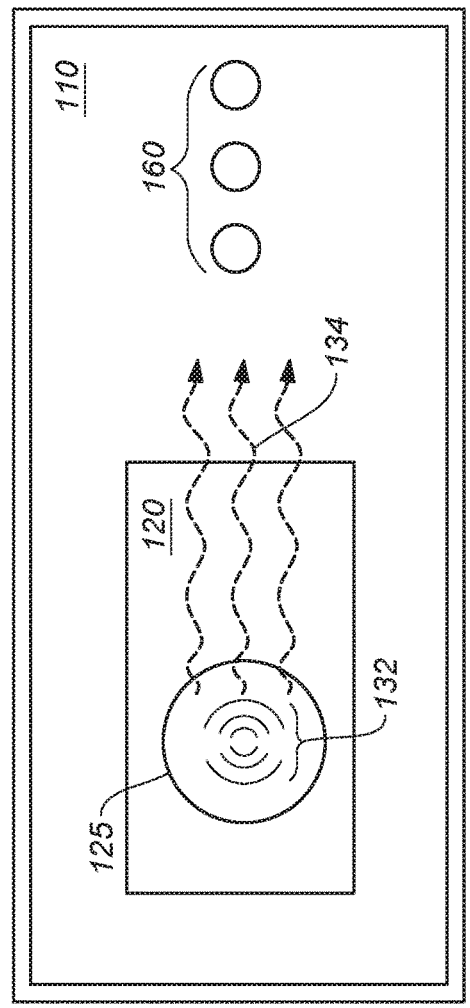
FIG. 2 shows a typical teleconference system subject to mechanical vibrations caused by direct coupling a speaker enclosure to a system housing.

In many contemporary teleconference systems, speaker enclosures are often integrated within the system housing (e.g., the housing that usually contains all of the primary communications electronics, including microphones, audio/video processing systems, etc., and typically sits on a table or other surface). Some examples of a contemporary system are shown in FIGS. 1-2. In operation, audio that is output by the speaker(s) is typically a voice of one or more participants originating from a different location (e.g., voice audio received by a party on the opposite end of the line). The voice is often amplified loud enough for all participants in the teleconference to hear the conversation. In some systems, a microphone may also be integrated within the system housing. The microphone(s) are often used to detect voice and other local audio, which is then transferred to the other participants at the other locations to facilitate two-way communication. However, the microphone(s) can also detect audio generated by the speaker, which if unchecked, can generate a positive feedback loop resulting in undesired audio effects and poor system performance. For example, the positive feedback loop may manifest as high-pitched audio feedback, continuous echoes of increasing amplitude, and other deleterious parasitic effects. Many systems typically utilize echo cancellation to detect audio generated by the speakers and actively cancel or suppress it to minimize the positive feedback loop, as would be understood by those of ordinary skill in the art.

Despite the ability to cancel audio generated by the speaker, integrated speakers typically generate mechanical vibrations that can be propagated throughout the teleconference system. These mechanical vibrations can cause "rub and buzz" in the system and may include vibrations in system components (e.g., capacitors, wires, harnesses, printed circuit boards, etc.), which can ultimately propagate these vibrations to the on-board microphone. The mechanical vibrations often manifest as vibrations in the audio spectrum (e.g., typically 100 Hz-1000 Hz) that conventional systems cannot differentiate from other audio sources (e.g., other participant voice or audio signals), and the mechanical vibration is usually comprised of a different frequency or frequencies than the audio generated by the speaker because mechanical vibrations caused by the speaker do not necessarily track the audio (e.g. voice) generated by the speaker. Therefore, contemporary echo cancellation systems are typically not equipped to recognize and differentiate parasitic mechanical vibrations detected by the microphone from legitimate voice signals from local teleconference participants. Thus, to avoid the risk of accidentally attenuating legitimate and intended voice signals (not generated by the speaker), the mechanical vibrations are often left unmitigated. As a result, certain audio performance characteristics may suffer including double talk, echo cancellation, total harmonic distortion, perceptual rub and buzz, and the overall frequency response of the system, as further described below and shown at least in FIGS. 8A-10B. A common but suboptimal method of reducing these types of performance degradation is to attenuate microphone sensitivity while certain audio frequencies are generated by the speaker, such that a near half-duplex form of communication occurs. As would be appreciated by one or ordinary skill in the art, this can be a very undesirable system performance characteristic.

In certain embodiments, a solution to the problem of mechanical vibrations propagating throughout the teleconference system (also referred to as a "teleconference device") is to mount and mechanically isolate the speaker/enclosure (often referred to as a "suspended speaker housing") within the system housing using damping cushions. The damping cushions operate to couple the suspended speaker housing to the system housing and presents the only path for which mechanical vibrations generated by the speaker can travel. As such, mechanical vibrations induced by the speaker can be highly attenuated before ever reaching the microphone(s) due to the material/mechanical properties of the damping cushions. Some examples are shown and further described with respect to FIGS. 3-7. Since little to no mechanical vibrations are detected by the microphone, very little parasitic positive feedback caused by the vibrations is passed through the communication channel. This can result in a marked improvement in the performance characteristics mentioned above.

By way of example, some implementations of a teleconferencing system include a system housing, a speaker enclosure configured within the system housing, a speaker mounted to the speaker enclosure, and one or more damping cushions that couple the speaker enclosure to the system housing. The one or more damping cushions suspend the speaker enclosure within the system housing such that the speaker enclosure is isolated and separated from the system housing by at least a minimum distance (e.g., 2 mm). The one or more damping cushions may be configured to dampen mechanical energy generated by the speaker and coupled to the system housing. The damping cushions may be of any suitable shape (e.g., bulb-shaped, bellows-shaped, cylinder shaped, spherical-shaped, etc.) and typically comprised of a pliable compound such as rubber (e.g., silicone), polyurethane ("PU"), or other polymer to dampen the mechanical energy generated by the speaker and coupled to the system housing (and ultimately the microphone). In some embodiments, materials can range from different types of foams, plastics, and rubbers (e.g., natural or synthetic, such as Nitrile, EPDM, SBR, silicone, etc.), which can be selected based on a number of criteria not limited to cost, its ability to absorb energy, moldability, tensile/compression strength, compression set at temperature high/low ranges (e.g., for speaker enclosure loading, orientations, etc.), flame retardance level (e.g., UL 94-V1 min, environmental considerations (e.g., UV, extreme temperatures, chemicals, etc.), and the like.

In some implementations, dampening effects may exceed 6 dB or more and some damping cushions may exhibit a non-linear force response profile. Unlike conventional systems that often couple the speaker enclosure to the system housing via hardware (e.g., screws, metal fasteners, etc.), no metal hardware (or other good conductor of mechanical energy) is used to couple the damping cushions to the speaker enclosure or system housing. Some embodiments of these novel features and more are described below in the embodiments that follow.

Many of the embodiments that follow include basic configurations of teleconference systems that may comprise a speaker, speaker housing (e.g., speaker enclosure), a system housing, and microphones. It should be understood that these examples are simplified in order to teach the novel concepts described herein and to prevent the obfuscation of concepts germane to the novelty for the sake of complexity. One of ordinary skill in the art with the benefit of this disclosure would understand that many variations, modifications, and alternative embodiments of the teleconference systems (e.g., described in FIGS. 3-7) are possible, and that the various embodiments, features, components, and the like, described in the group of figures that follow may be combined in any suitable manner.

FIG. 1 shows a typical teleconference system 100. Teleconference system ("system") 100 includes a speaker 125 directly mounted to a speaker enclosure 120. Speaker enclosure 120 is directly mounted inside and fastened to system housing 110 using conventional hardware including screws 130(1-4) and grommets 140 (1-4). Grommets are typically comprised of a solid, dense plastic or rubber. Typical systems 110 may utilize any suitable hardware including pins, tabs, mounting systems, rivets, screws (e.g., shoulder screws), washers, locking nuts, brackets, or other suitable hardware that can be used to fasten and secure speaker enclosure 120 to system housing 110. Foam inserts are sometimes used to lower manufacturing costs, but typically only in systems without on-board microphones as they can negatively affect audio performance characteristics of the teleconference system, as described below. Other types of fasteners can be found in conventional systems including friction mounted sleeves (e.g., speaker enclosure 120 is friction mounted inside a sleeve and secured therein) embedded within system housing 110, as would be appreciated by one of ordinary skill in the art with the art.

Conventional systems utilizing integrated speakers are often subject to mechanical vibrations caused by the speaker(s) that may be propagated throughout the teleconference system. These mechanical vibrations can cause rub and buzz ("R&B") in the system and may include vibrations in system components (e.g., capacitors, wires, harnesses, printed circuit boards, etc.) or even the housing(s) themselves, which can ultimately propagate these vibrations to the on-board microphone. The propagation of mechanical vibrations may occur by speaker enclosure 120 directly contacting with and transferring mechanical vibrations to system housing 110. Mechanical vibrations can also be propagated 150(1-4) through the fastening hardware (e.g., screws 130(1-4) and grommets 140 (1-4), which are good conductors of mechanical energy. In some cases, wire harnesses coupled to speaker 125 and one or more structures (e.g., PCBs, sockets, etc.) of system housing 110 may be a conduit for mechanical vibrations. Other potential conduits of mechanical energy may exist, as would be appreciated by one of ordinary skill in the art. As described above, mechanical vibrations often manifest as vibrations in the audio spectrum that conventional systems such as system 100 cannot differentiate from other audio sources. Some typical problem frequencies range between 50 Hz and 1000 Hz. In some cases, the resonance frequency of the speaker enclosure tends to vibrate the system the most, which typically ranges from 80 Hz to 300 Hz (in the voice spectrum), although other ranges are possible. The voice spectrum is typically 100 Hz-1 kHz, although some may consider 100 Hz-3 kHz or 300 Hz-3 kHz to define the voice spectrum, as would be appreciated by one of ordinary skill in the art. Consequently, mechanical vibrations are usually comprised of a different frequency or frequencies than the audio generated by the speaker, and therefore, contemporary echo cancellation systems are typically not equipped to recognize and differentiate parasitic mechanical vibrations detected by the microphone from legitimate voice signals from local teleconference participants. A simplified example of this phenomenon is depicted in FIG. 2, which shows both reproduced audio 132 and mechanical vibrations 134 generated by speaker 125 reaching microphones 160. As indicated above, mechanical vibrations can cause rub and buzz, which may detrimentally affect certain performance characteristics including double talk, echo cancellation, total harmonic distortion ("THD"), and the overall frequency response of the system, as shown in the performance data presented in FIGS. 8A-10B.

Some conventional systems address these types of performance degradation by attenuating microphone sensitivity while certain audio frequencies are generated by the speaker, such that a near half-duplex form of communication occurs.

In some systems, other means are used to attenuate the amount of vibrations coupled from the system housing to the microphones. For instance, glue or other adhesive is often used to secure components to prevent them from buzzing. Harnesses may be used to keep vibrating wires from contacting other components. In some cases, foam and other insulating materials may be used to further reduce mechanical vibrations. However, these solutions often add significant costs to manufacturing, reduce product yields, and typically do not reduce the mechanical vibrations that reach the microphone to a degree that produces even marginal improvements in the performance characteristics described above.

Embodiments Using a Suspended and Isolated Speaker Housing

To address the problems with mechanical vibrations described above, aspects of the present invention relate a suspended speaker housing that is integrated with the system housing but mechanically isolated from it. In such an implementation, mechanical vibrations in the suspended speaker housing would not mechanically transfer to the system housing because there would be no physical path to conduct the mechanical vibrations. Some vibrations may be transferred from the suspended speaker housing to the system housing over the air, but the attenuation over even a very small air gap (e.g., 2 mm) would be substantial enough to effectively eliminate mechanical vibrations detected at the microphones. The embodiments described herein typically refer to a gap between the suspended speaker housing and the system housing of at least 2 mm, which can accommodate for most typical manufacturing and assembly tolerances while still maintaining an acceptable air gap for sufficient attenuation. The 2 mm gap is also sufficient to absorb most movement of the suspended speaker housing within the system housing due to movement of the teleconference system/device itself, or movements caused by the operation of the speaker. Note that other gap sizes that are smaller or larger than 2 mm may be used, as would be appreciated by one of ordinary skill in the art with the benefit of this disclosure.

Figure 4:
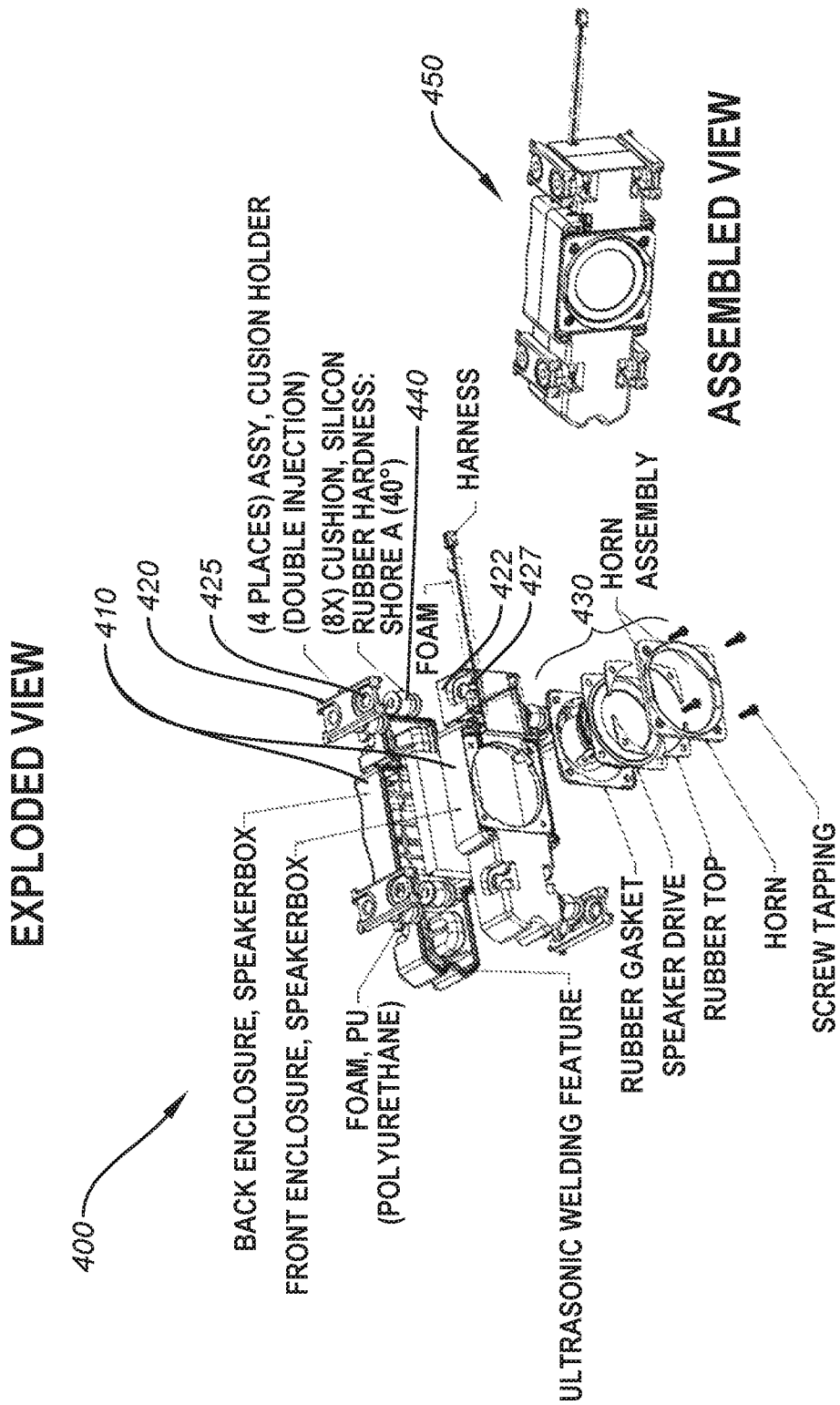
FIG. 4 shows an exploded view of a suspended and isolated speaker assembly for use in a teleconference system, according to certain embodiments.
Figure 6:
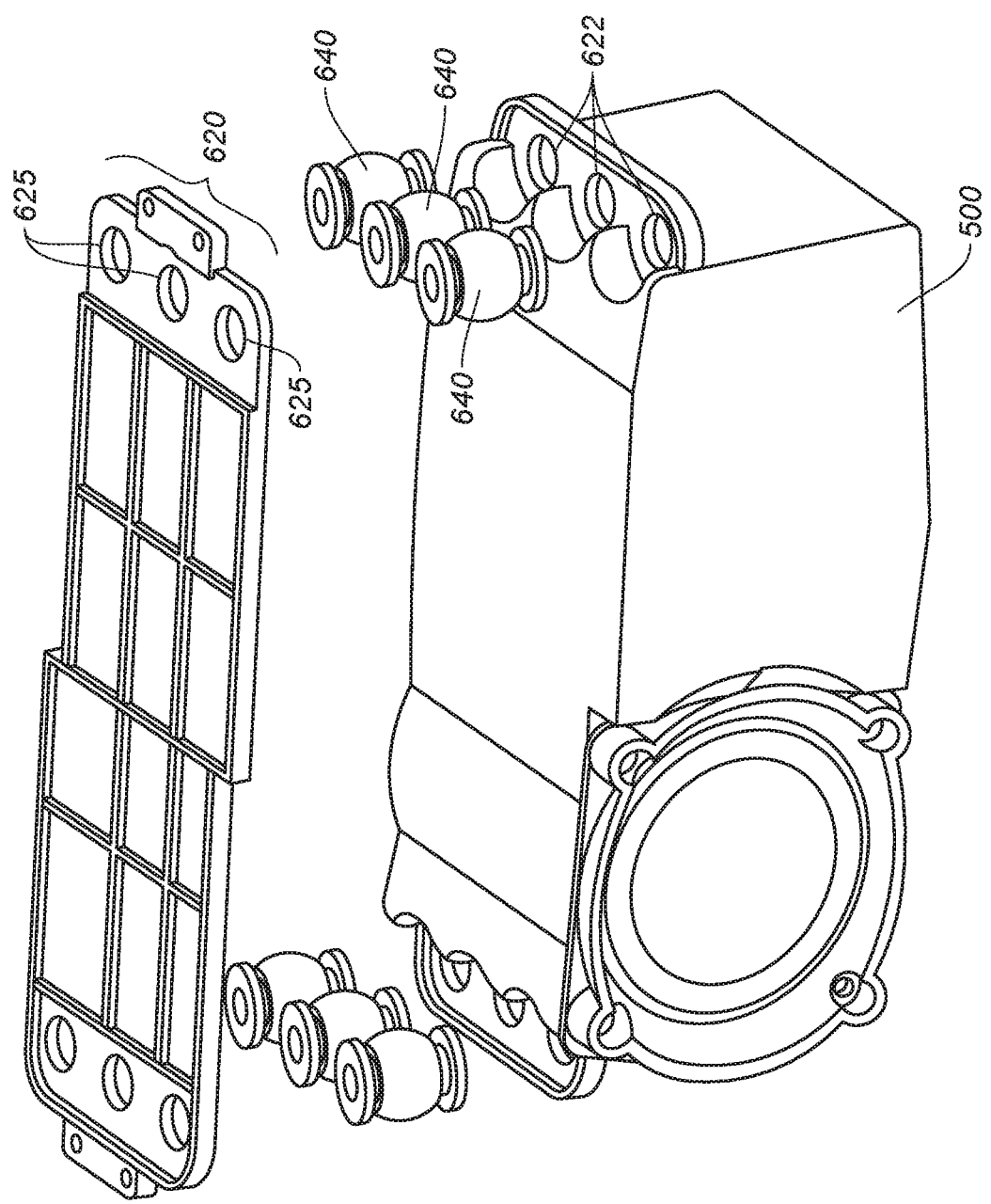
FIG. 6 shows a speaker housing coupled to a system housing, according to certain embodiments.
Figure 7:
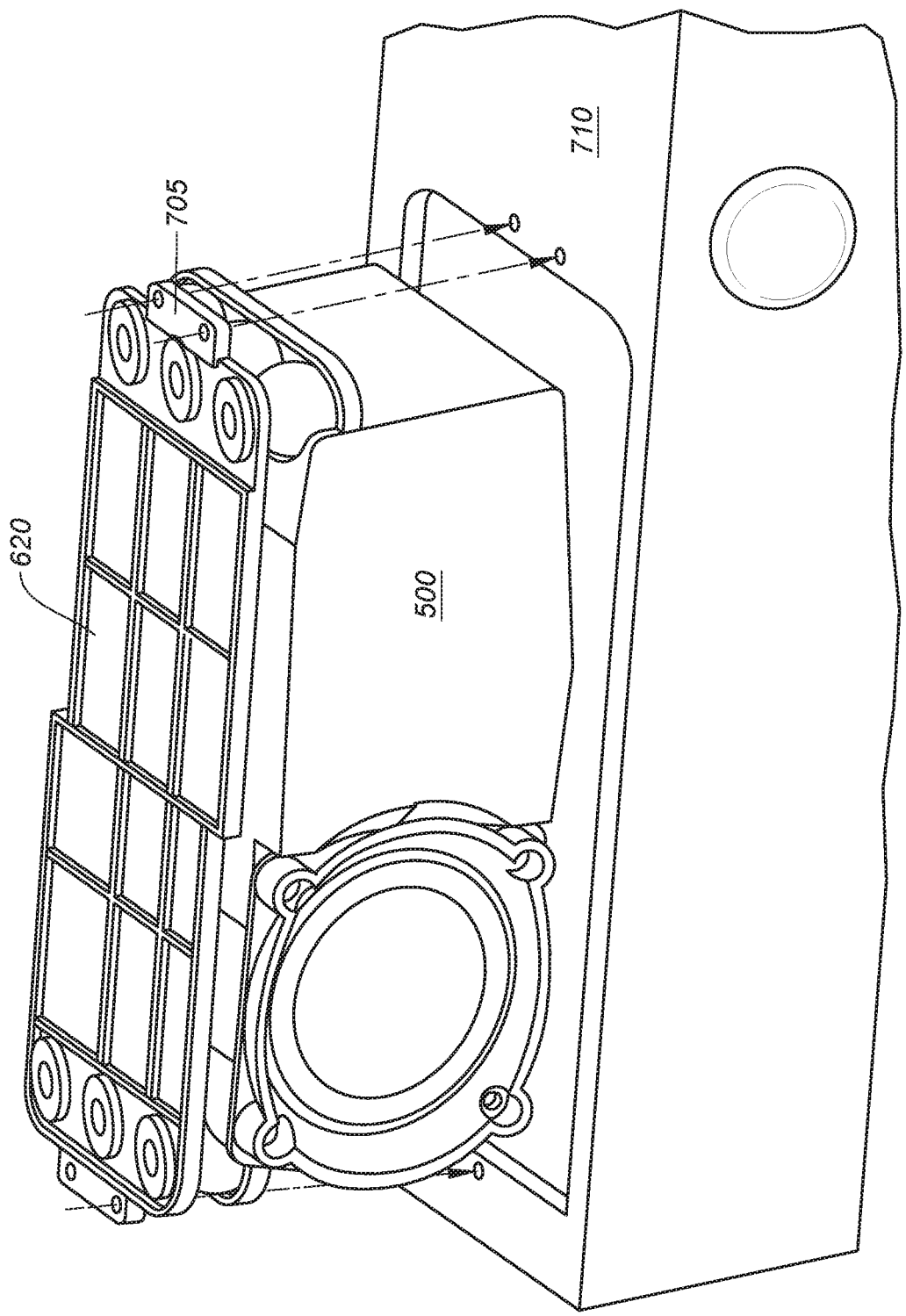
FIG. 7 shows a speaker housing coupled to a system housing, according to certain embodiments.

Isolating and suspending the speaker housing within the system housing may be achieved using any suitable means. Some of the embodiments described herein use one or more damping cushions to both suspend the speaker housing within the system housing and mechanically isolate the two. A damping cushion may be a rubber bulb, as shown in FIGS. 4 and 6-7, although other shapes are contemplated. For instance, some damping cushions may a cylindrical shape, a spherical shape, a bellows shape, or other suitable configuration. In some cases, the damping cushions are hollow and typically have an even thickness. Some embodiments of the damping cushion are air filled but open ended, which has excellent vibrational attenuation properties. Alternatively, some embodiment may using damping cushions that are closed off and filled with a suitable gas (e.g., air), gels, or similar compressible materials. In some embodiments, damping cushions can have a hardness (durometer) of Shore A 40°-50°, though other values are possible. In certain implementations, damping cushion holders (e.g., see 420 of FIG. 4) can also provide damping properties. For instance, some damping cushion holders (e.g., see 450 of FIG. 4) may be comprised of a soft material (e.g., TPE) over-molding on plastic (PC/ABS, ABS) material to provide a second isolation to the vibration from the speaker enclosure housing. Referring to FIG. 4, the cushion holders (420) can have four location pins through a bridge and triangular structure to form a self-balanced force distribution for the stability of speaker enclosure cushion system described herein. Typically, embodiments of the invention may utilize polymers, elastomers, rubbers, etc., although other exotic materials are contemplated (e.g., fabrics, fibrous materials, etc.).

In some embodiments, while damping cushions may technically provide a mechanical coupling of the speaker housing to the system housing (e.g., via the rubber walls of the damping cushion), the combination of the isolation of the speaker housing (e.g., 2 mm from the system housing), along with the exceptional attenuation properties of the air within the damping cushion, and the poor vibration conduction qualities of the rubber wall of the damping cushion can still provide a substantial reduction in mechanical vibrations detected at the microphone(s). In certain embodiments, the damping cushions are the only structural coupling elements configured to couple the isolated speaker housing and the system housing. In this context, structural coupling may refer to how the speaker housing is assembled and secured within the system housing. In some cases, other components such as speaker wires or harnesses may be mechanically coupled to the system housing, but such components are not structural elements as they do not operate to secure the speaker housing within the system housing in a manner that would be appreciated by one or ordinary skill in the art with the benefit of this disclosure. Although not discussed in detail, other isolation techniques are contemplated including foam-based coupling cushions, electromagnetic suspension systems, or other suitable method that effectively isolates mechanical vibrations generated by the speaker to the speaker enclosure. Thus, the use of a suspended and mechanically isolated speaker housing eliminates the need to control vibrations in the system housing via glue, cable harnesses, foam inserts, or other remedial measures, which are far less effective, more costly, and subject to inconsistent performance characteristics.

Figure 3:
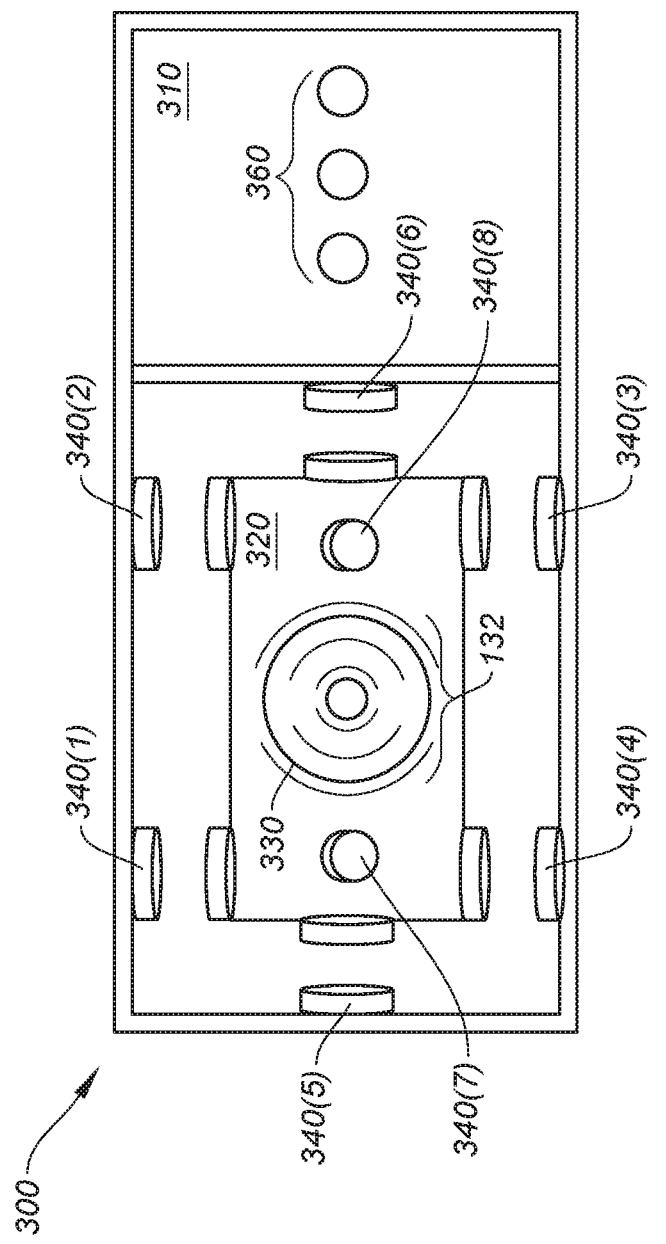
FIG. 3 shows a simplified block diagram of a teleconference system with a suspended speaker housing, according to certain embodiments.

FIG. 3 shows a simplified block diagram of a teleconference system 300 with a suspended speaker housing 320, according to certain embodiments. System 300 includes system housing 310, a suspended speaker housing 320 with a speaker 330 coupled therein. One or more damping cushions 340(1-8) are shown in a simplified representation, accentuating an air gap between the suspended speaker housing 320 and system 310, as well as the air gap provided within the damping cushion (e.g., in the bulb of the damping cushion). That is, the representation shown in FIG. 3 represents the body of the damping cushions as transparent to better convey the point that the speaker housing is mechanically isolated, and it is to be understood that the body of the damping cushions physically couple the speaker housing to the system housing (see, e.g., damping cushion 640 of FIG. 6). Microphones 360 are coupled to system housing 310. As described above, isolating suspended speaker housing 320 in the manner described herein prevents or substantially attenuates any mechanical vibrations generated by speaker 330 and coupled to microphone(s) 360 on system housing 310. Although some of the embodiments show a suspension of suspended speaker housing 320 in one dimension (e.g., see FIG. 4), damping cushions 340 may be configured in two dimensions (e.g., shown in FIG. 3) or three dimensions to better accommodate movement in two or three dimensions, respectively. Referring to FIG. 3, damping cushions 340(1-4) are mounted along a first axis, damping cushions 340(5-6) are mounted in a second axis, and damping cushions 340(7-8) are mounted on a third axis. It should be noted that even damping cushions configured in one dimension may have damping properties that reduce/attenuate/dampen movement and/or vibrations (e.g., referred to as mechanical vibrations, mechanical energy, vibrational energy, etc.) in three dimensions as some damping cushions may resist and dampen movement lateral (e.g., orthogonal) to its mounting orientation. For example, as shown in FIG. 4, damping cushions 420 are shown mounted above and below the speaker enclosure (also referred to as a "speakerbox") and oriented along a single axis (e.g., z-axis or up/down on the page). Although no damping cushions are shown to be oriented in other directions (e.g., x or y axes), mechanical energy (e.g., vibrational energy generated by the speaker) directed in all three dimensions (e.g., omnidirectional vibrations) can still be damped by a single-axis-mounted damping cushion by virtue of the damping properties of the damping cushion. This is a marked improvement over conventional designs, which do not dampen mechanical energy that passes through the screw/grommet coupling (see, e.g., shoulder screw and grommet—as shown in FIG. 1. Even assuming for the sake of argument that some conventional designs with rubber grommets may reduce a miniscule amount of vibrations that pass through the rubber (but with no discernable improvement in audio performance characteristics, such as those described below with respect to FIGS. 8A-10B), damping would only occur in the direction parallel to the screw.

FIG. 4 shows an exploded view of a suspended and isolated speaker assembly 400 for use in a teleconference system, according to certain embodiments. Speaker housing assembly 450 shows the exploded view for speaker housing assembly 400 in an assembled state. Speaker housing (labeled "enclosure") 410 can include cushion holders 422, cushion slot lowers 427, damping cushions 440, and speaker assembly 430. Cushion holder 420 and corresponding cushion slot upper 425 may be a part of the system housing and is presented in FIG. 4 to show how speaker housing 410 can be coupled to the system housing. In some embodiments, speaker housing 410 may be coupled to the system housing or a portion thereof (e.g., cushion holder 420) via damping cushions 440. For instance, an upper flange of damping cushion 440 may couple to the system housing by way of cushion slot upper 425 of cushion holder 420, and a lower flange of damping cushion 440 may couple to speaker housing 410 by way of cushion slot lower 427 of cushion holder 422, as shown in speaker housing assembly 450. Note that damping cushions can be secured in place without the use of any hardware (e.g., screws, pins, tabs, or other fasteners) by sliding into cushion slots 425. In some instances, coupling the speaker housing to the system housing using no hardware may be preferable as hardware tends to be a good conductor of mechanical energy, as further discussed above.

Figure 5:
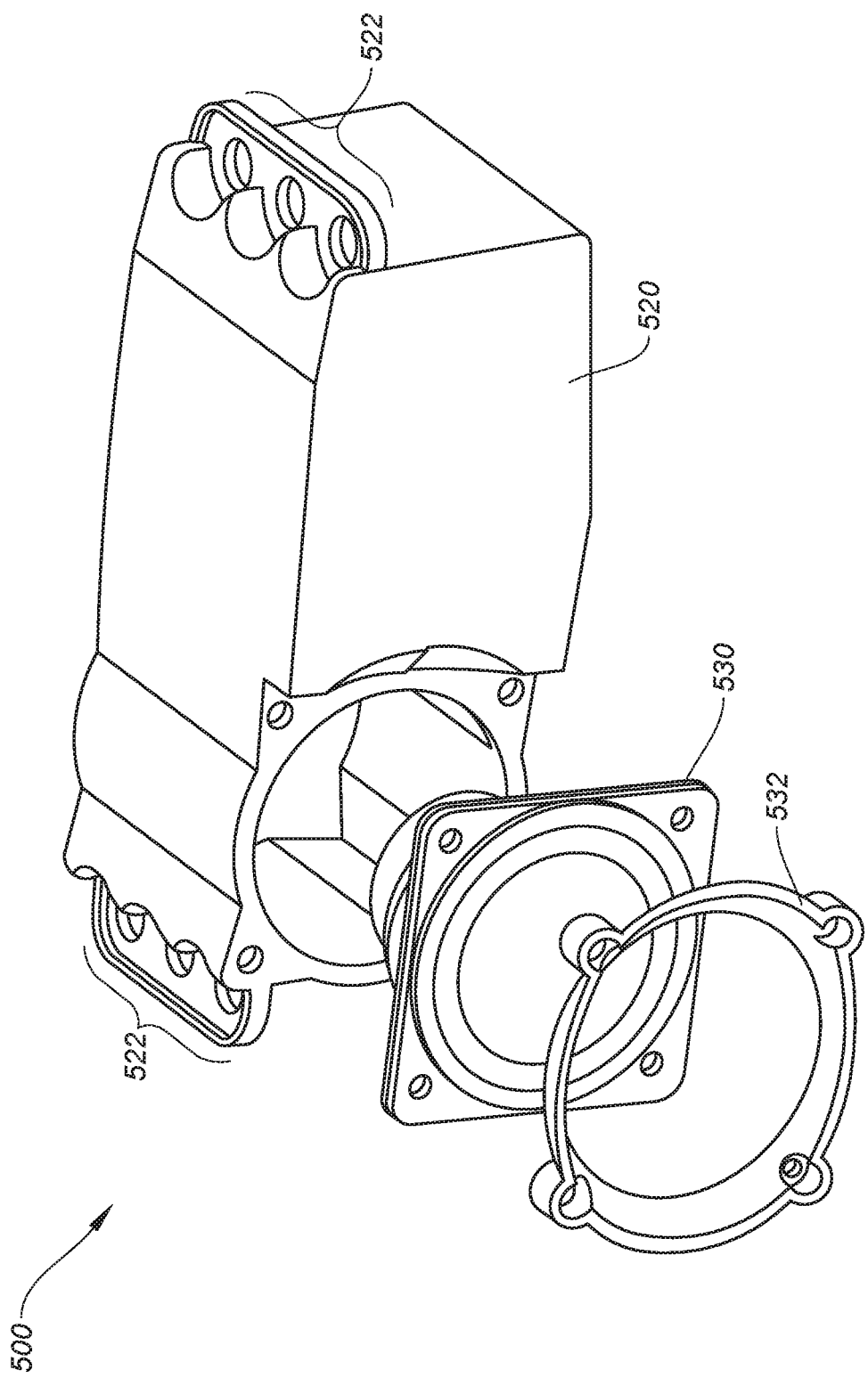
FIG. 5 shows an example of a speaker assembly, according to certain embodiments.

FIG. 5 shows an example of a speaker assembly 500, according to certain embodiments. Speaker assembly 500 may include a speaker 530 and fastening hardware 532. Speaker assembly 520 may include cushion holder 522 to couple to a bottom side of the damping cushions (see, e.g., FIG. 4). Although the embodiment shown shows 3×3 cushion holders configured in one dimension, any number of cushion holders may be used and they may be configured in any suitable number of dimensions.

FIG. 6 shows a speaker housing 500 coupled to a system housing, according to certain embodiments. Cushion holder 620 (shown as a mounting plate), when the teleconference system is fully assembled, may be directly coupled to the system housing (as shown in FIG. 7). Speaker housing 500 can be coupled to the system housing via one or more damping cushions. For example, an upper flange of damping cushion 640 may couple to the system housing by way of a corresponding retention hole 625 of cushion holder 620, and a lower flange of damping cushion 640 may couple to speaker housing 500 by way of a corresponding retention hole 622. Although certain features like cushion slots, retention holes, and cushion holders are included in some of the embodiments described herein, it should be understood that any suitable method of coupling the cushion holder to speaker housing 500 and the system housing may be used, as would be appreciated by one of ordinary skill in the art with the benefit of this disclosure.

FIG. 7 shows a speaker housing coupled to a system housing, according to certain embodiments. Cushion holder 620 (shown as a plate) may be coupled to system housing 710 via flanges 705 via any suitable hardware or other coupling implementation. When cushion holder 620 is coupled to system housing 710, speaker housing 500 will be "floating" and isolated from system housing 710 by a distance (e.g., typically 2 mm or more) based on deflection properties (e.g., durometer rating) of damping cushions 640 (shown compressed in FIG. 7). Other mounting characteristics can also affect the isolation distance between system housing 710 and speaker housing 500 including the number of damping cushions 640 used, their spatial configuration (e.g., how far apart they are), their dimensional configurations (e.g., mounted in one, two, or three dimensions), and the like. Mechanical vibrations generated by speaker 530 and propagated throughout speaker housing 500 can generally only pass to system housing 710 via damping cushions 640, which may significantly attenuate the amplitude of the mechanical vibrations and improve certain audio performance characteristics including double talk, echo cancellation, total harmonic distortion, perceptual rub and buzz, and the overall frequency response of the system.

Audio Performance Characteristics Using a Suspended Speaker Housing

Figure 8A:
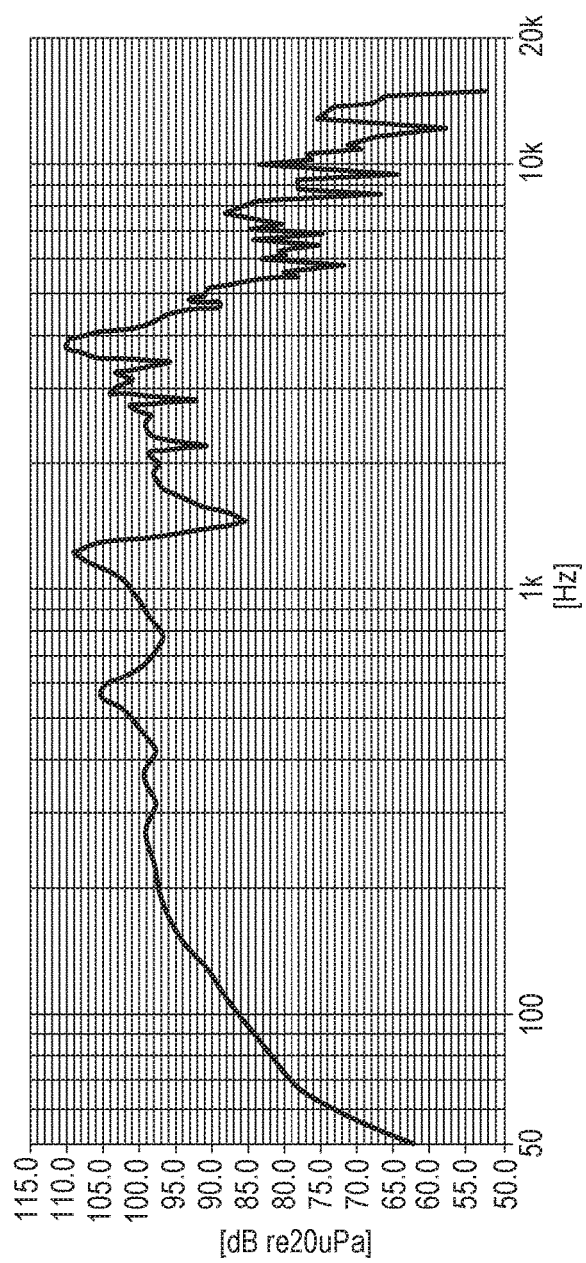
FIG. 8A shows a frequency response curve for a conventional teleconference system using a speaker housing directly coupled to the system housing.

FIG. 8A shows a frequency response loop back curve measured from speaker to microphone for a conventional teleconference system using a speaker housing directly coupled to the system housing (e.g., via screws and grommets, as shown in FIG. 1). Due to mechanical vibrations detected at the microphone, the frequency response for the system begins dropping significantly between 1-1.5 kHz and, at some frequencies, as much as 20 dB or more. The frequency response begin to improve again about 1.5 kHz to 4 kHz.

Figure 8B:
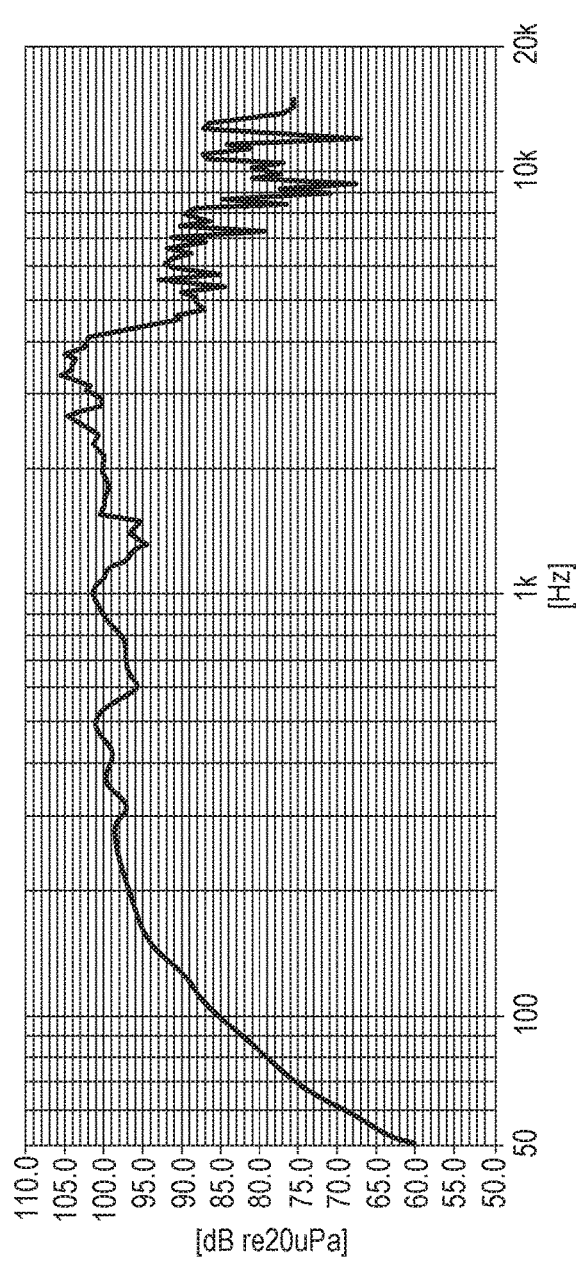
FIG. 8B shows a frequency response curve for a teleconference system using a suspended speaker housing, according to certain embodiments

FIG. 8B shows a frequency response loop back curve measured from speaker to microphone for a teleconference system using a suspended speaker housing, according to certain embodiments (see, e.g., FIGS. 3-7). In contrast to the poor frequency response shown in FIG. 8A, the frequency response curve is more linear with the greatest drop of about 5 dB at 1.5 kHz.

Figure 9A:
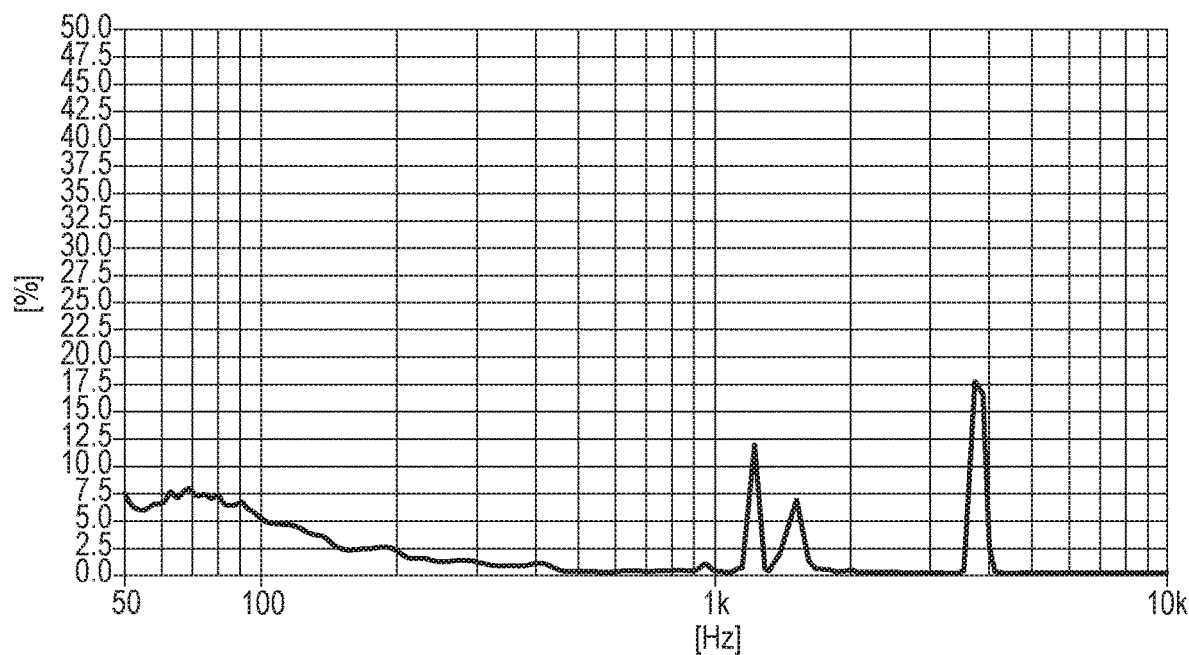
FIG. 9A shows a plot of total harmonic distortion (THD) vs. frequency for a conventional teleconference system.

FIG. 9A shows a loop back curve measured from speaker to microphone for total harmonic distortion (THD) vs. frequency for a conventional teleconference system. Due to mechanical vibrations detected at the microphone, the THD has significant spikes at several frequencies including over 10% at about 1.3 kHz and over 17% at about 3.8 kHz.

Figure 9B:
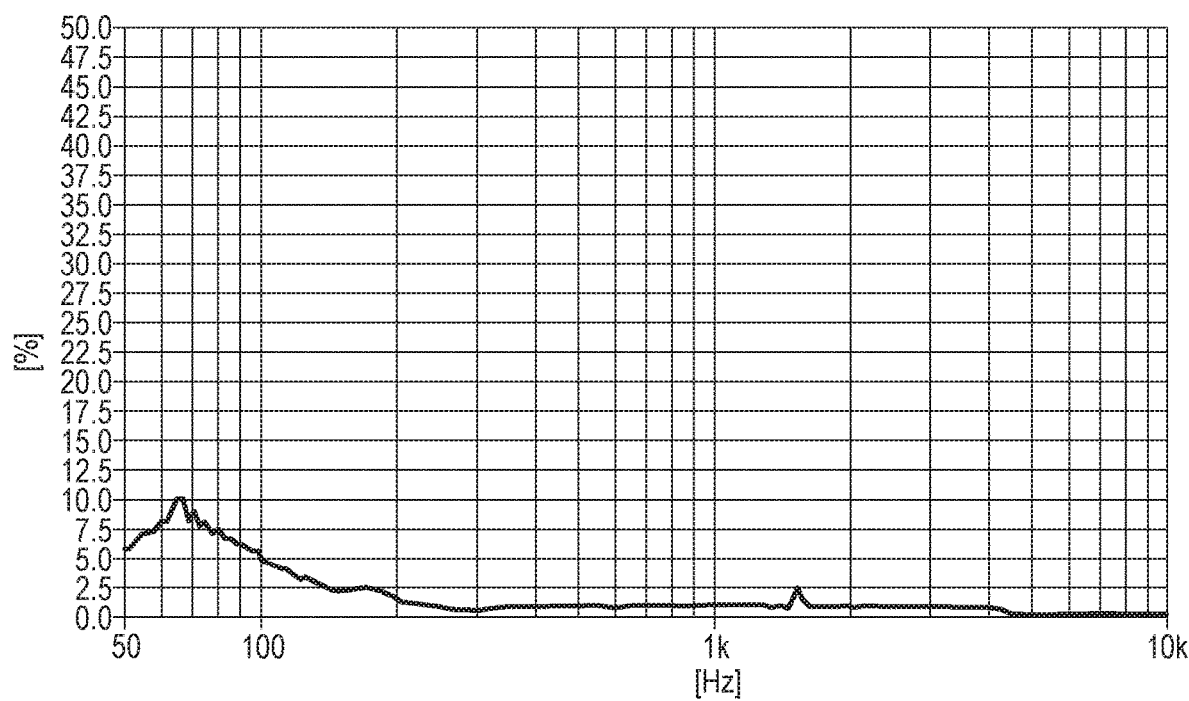
FIG. 9B shows a plot of THD vs. frequency for a teleconference system using a suspended speaker housing, according to certain embodiments.

FIG. 9B shows a loop back curve measured from speaker to microphone for THD vs. frequency for a teleconference system using a suspended speaker housing, according to certain embodiments (see, e.g., FIGS. 3-7). In contrast to the poor THD shown in FIG. 8A, the THD generally remains below 2% from 200 Hz-10 kHz. A small spike of about 1% occurs at about 1.7 kHz.

Figure 10A:
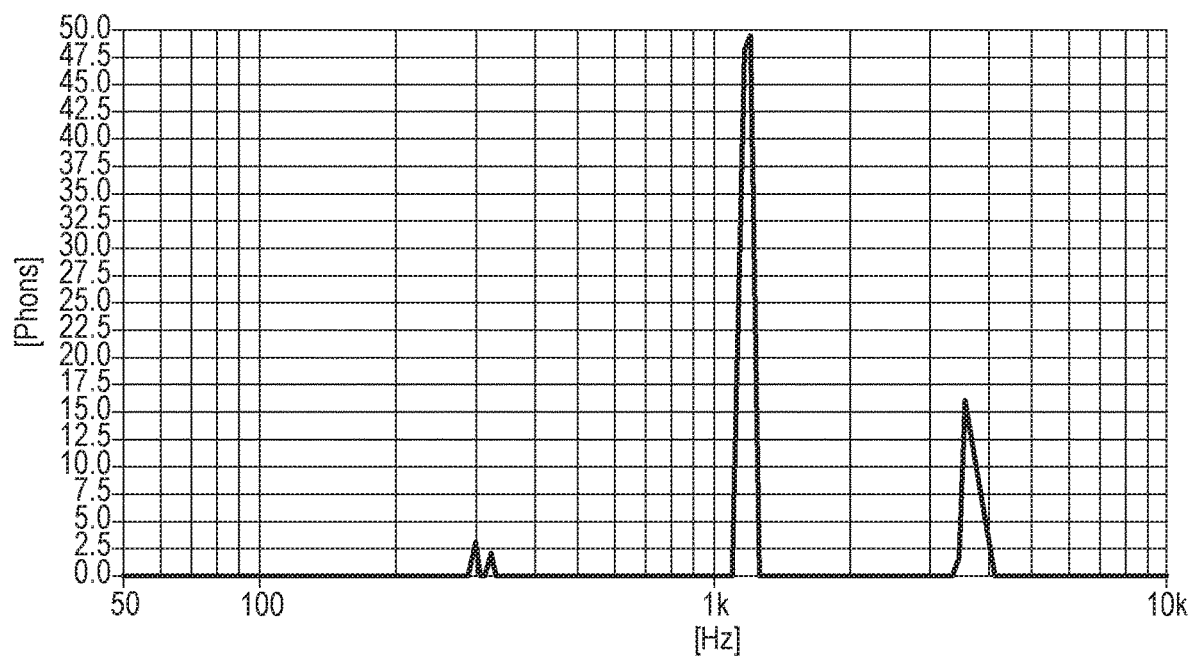
FIG. 10A shows a plot of perceptual rub and buzz vs. frequency for a conventional teleconference system.

FIG. 10A shows a loop back curve measured from speaker to microphone for perceptual rub and buzz (R&B) vs.

frequency for a conventional teleconference system. Due to mechanical vibrations detected at the microphone, the perceptual R&B has significant spikes at several frequencies including over 48 phons at about 1.3 kHz and over 15 phons at about 3.8 kHz.

Figure 10B:
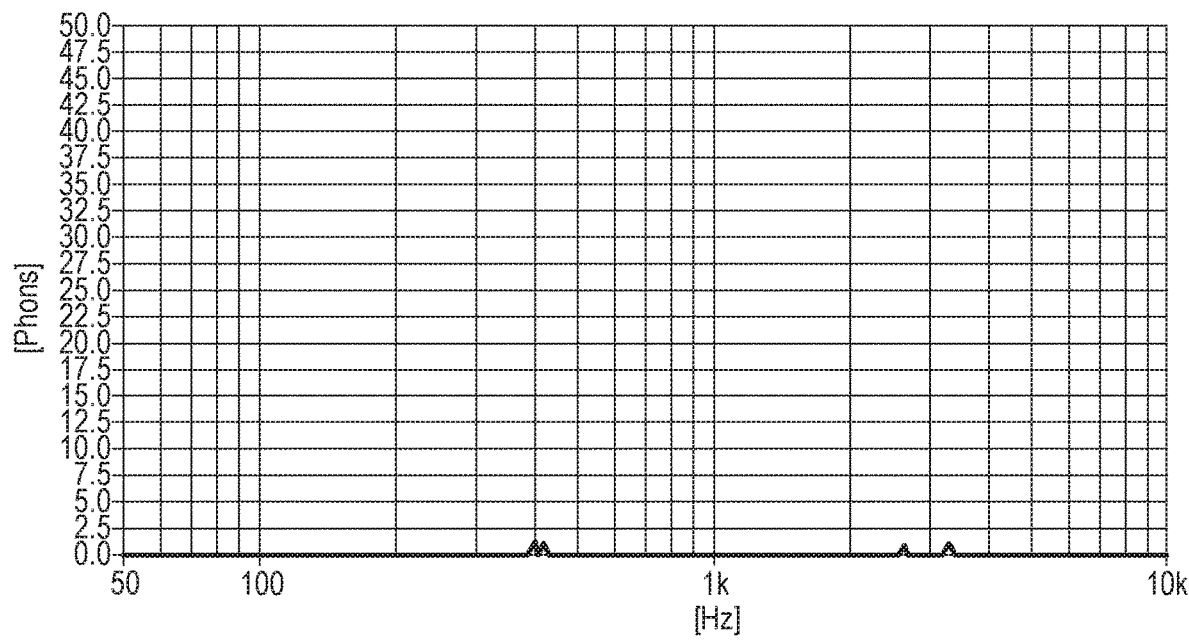
FIG. 10B shows a plot of perceptual R&B vs. frequency for a teleconference system using a suspended speaker housing, according to certain embodiments.

FIG. 10B shows a loop back curve measured from speaker to microphone for perceptual R&B vs. frequency for a teleconference system using a suspended speaker housing (see, e.g., FIGS. 3-7), according to certain embodiments. In contrast to the poor perceptual R&B shown in FIG. 8A, the perceptual R&B generally remains below 1 phons from 0-10 kHz.

Figure 11:
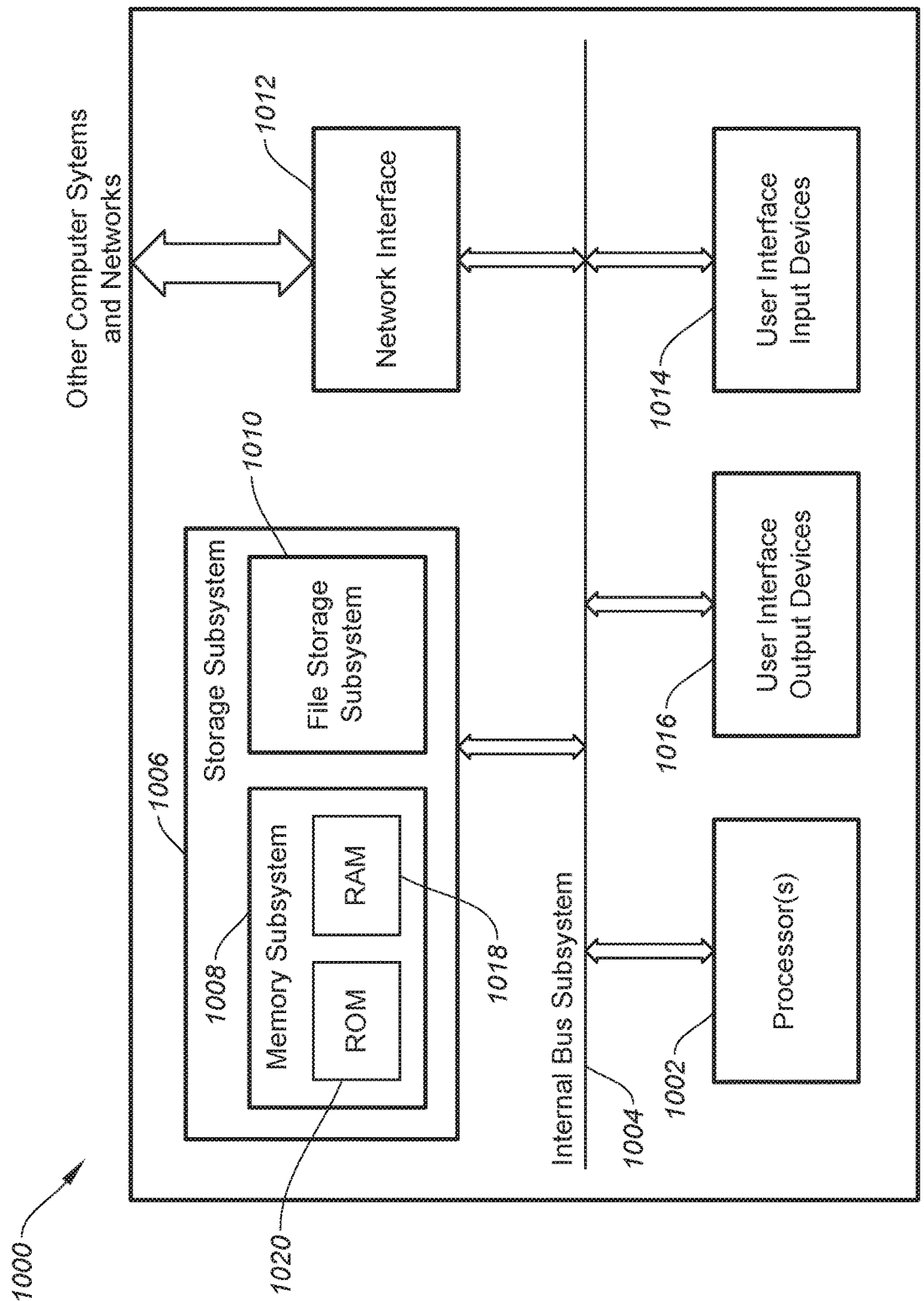
FIG. 11 is a simplified block diagram of a system for operating a teleconference system, according to certain embodiments.

FIG. 11 is a simplified block diagram of a teleconference system ("system") 1100 for operating a teleconference system, according to certain embodiments. System 1100 can be used to implement any of the teleconference devices discussed above with respect to FIGS. 3-10B. Computer system 1100 can include one or more processors 1102 that can communicate with a number of peripheral devices (e.g., input devices) via a bus subsystem 1104. These peripheral devices can include storage subsystem 1106 (comprising memory subsystem 1108 and file storage subsystem 1110), user interface input devices 1114, user interface output devices 1116, and a network interface subsystem 1112.

In some examples, internal bus subsystem 1104 can provide a mechanism for letting the various components and subsystems of computer system 1100 communicate with each other as intended. Although internal bus subsystem 1104 is shown schematically as a single bus, alternative embodiments of the bus subsystem can utilize multiple buses. Additionally, network interface subsystem 1112 can serve as an interface for communicating data between computer system 1100 and other computer systems or networks. Embodiments of network interface subsystem 1112 can include wired interfaces (e.g., Ethernet, CAN, RS232, RS485, etc.) or wireless interfaces (e.g., ZigBee, Wi-Fi, cellular, etc.).

In some cases, user interface input devices 1114 can include a buttons and/or controls for interfacing with the teleconference system, one or more cameras (e.g., for video conferencing), audio input devices (e.g., one or more microphones, voice recognition systems), a keyboard (hardware or soft keyboard), pointing devices (e.g., mouse, trackball, touchpad, etc.), a touch-screen incorporated into a display, Human Machine Interfaces (HMI) and other types of input devices. In general, use of the term "input device" is intended to include all possible types of devices and mechanisms for inputting information into system 1100. Additionally, user interface output devices 1116 can include a display subsystem, or non-visual displays such as audio output devices, etc. The display subsystem can be any known type of display device. In general, use of the term "output device" is intended to include all possible types of devices and mechanisms for outputting information from system 1100.

Storage subsystem 1106 can include memory subsystem 1108 and file/disk storage subsystem 1110. Subsystems 1108 and 1110 represent non-transitory computer-readable storage media that can store program code and/or data that provide the functionality of embodiments of the present disclosure. In some embodiments, memory subsystem 1108 can include a number of memories including main random access memory (RAM) 1118 for storage of instructions and data during program execution and read-only memory (ROM) 1120 in which fixed instructions may be stored. File storage subsystem 1110 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that system 1100 is illustrative and not intended to limit embodiments of the present disclosure. Many other configurations having more or fewer components than system 1100 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A teleconferencing system comprising:
    a system housing;
    a speaker enclosure configured within the system housing;
    a speaker mounted to the speaker enclosure; and
    one or more damping cushions coupling the speaker enclosure to the system housing, wherein the one or more damping cushions suspend the speaker enclosure within the system housing such that the speaker enclosure is isolated and separated from the system housing by at least a minimum distance,
    wherein the one or more damping cushions provide an only structural coupling between the speaker enclosure and the system housing, and
    wherein the one or more damping cushions are configured to dampen mechanical energy generated by the speaker thereby preventing at least a portion of the mechanical energy from coupling to the system housing via the one or more damping cushions.

2. The teleconferencing system of claim 1 wherein each of the one or more damping cushions is formed of a non-rigid and pliable compound.

3. The teleconferencing system of claim 2 wherein at least a portion of each of the one or more damping cushions is bulb-shaped.

4. The teleconferencing system of claim 1 wherein the one or more damping cushions are configured to support and suspend the speaker housing within the system housing along three dimensions.

5. The teleconferencing system of claim 1 further comprising:
a microphone disposed in the system housing,
wherein the one or more damping cushions are further configured to reduce an amount of mechanical energy generated by the speaker and coupled to the microphone via the one or more damping cushions.

6. The teleconferencing system of claim 1 wherein the one or more damping cushions dampen audio spectrum mechanical energy generated by the speaker and mechanically coupled to the system housing by at least 6 dB.

7. The teleconferencing system of claim 6 wherein the audio spectrum is a voice spectrum of 100 Hz—3000 Hz.

8. The teleconferencing system of claim 1 wherein the one or more damping cushions have a non-linear force response profile.

9. The teleconferencing system of claim 1 wherein the minimum distance is 2 mm.

10. A teleconferencing system comprising:
a system housing;
a speaker enclosure configured within the system housing;
a speaker mounted to the speaker enclosure;
one or more damping cushions coupling the speaker enclosure to the system housing, wherein the one or more damping cushions suspend the speaker enclosure within the system housing such that the speaker enclosure is isolated and separated from the system housing,
wherein the one or more damping cushions provide an only structural coupling between the speaker enclosure and the system housing, and
wherein the one or more damping cushions have a non-linear force response profile causing the one or more damping cushions to increase in compression resistance at an increasing rate as an increased compression is applied.

11. The teleconferencing system of claim 10 wherein at least a portion of each of the one or more damping cushions is bulb-shaped.

12. The teleconferencing system of claim 10 wherein each of the one or more damping cushions are formed of a non-rigid, pliable compound.

13. The teleconferencing system of claim 10 wherein the one or more damping cushions are configured to support and suspend the speaker housing within the system housing along three dimensions.

14. The teleconferencing system of claim 10 further comprising:
a microphone disposed in the system housing,
wherein the one or more damping cushions are further configured to reduce an amount of mechanical energy generated by the speaker and coupled to the microphone via the one or more damping cushions.

15. The teleconferencing system of claim 10 wherein the one or more damping cushions dampen audio spectrum mechanical energy generated by the speaker and mechanically coupled to the system housing by at least 6 dB.

16. The teleconferencing system of claim 10 wherein an audio spectrum of the teleconferencing system is a voice spectrum of 100 Hz—3000 Hz.

17. The teleconferencing system of claim 10 wherein the speaker enclosure is separated by at least a minimum threshold distance of 2 mm.

18. A teleconferencing system comprising:
a system housing;
a speaker enclosure configured within the system housing;
a speaker mounted to the speaker enclosure;
a microphone coupled to the system housing; and
one or more damping cushions coupling the speaker enclosure to the system housing, wherein the one or more damping cushions suspend the speaker enclosure within the system housing such that the speaker enclosure is isolated and separated from the system housing by at least a minimum distance,
wherein the one or more damping cushions provide an only structural coupling between the speaker enclosure and the system housing, and
wherein the one or more damping cushions dampen vibrational energy generated by the speaker thereby preventing at least a portion of any mechanical energy from coupling to the microphone via the one or more damping cushions by at least 6 dB.

19. The teleconferencing system of claim 18 wherein each of the one or more damping cushions is mounted in a particular axis, and wherein each of the one or more damping cushions provide dampening of the vibrational energy along both the mounted axis and at least one axis orthogonal to the mounted axis.

20. The teleconferencing system of claim 19 wherein at least a portion of the one or more damping cushions is bulb-shaped.

* * * * *